United States Patent [19]
Koch

[11] Patent Number: 5,927,144
[45] Date of Patent: Jul. 27, 1999

[54] DRIVE FOR ADJUSTING PARTS OF SEATING AND RECLINING FURNITURE

[76] Inventor: Dietmar Koch, Zur Merhardt 9, Gummersbach, Germany, 51645

[21] Appl. No.: 08/836,598
[22] PCT Filed: Oct. 12, 1995
[86] PCT No.: PCT/DE95/01432
  § 371 Date: Apr. 17, 1997
  § 102(e) Date: Apr. 17, 1997
[87] PCT Pub. No.: WO96/12123
  PCT Pub. Date: Apr. 25, 1996

[30] Foreign Application Priority Data

Oct. 18, 1994 [DE] Germany .......................... 94 16 742 U
Nov. 2, 1994 [DE] Germany .......................... 94 17 433 U

[51] Int. Cl.⁶ .............................. F16H 25/20; A47C 20/04
[52] U.S. Cl. .............................. 74/89.15; 74/458; 74/459; 297/330; 297/344.1
[58] Field of Search .................................. 74/89.15, 459, 74/458, 424.8 R, 509; 297/362.14, 330, 344.1, 344.11

[56] References Cited

U.S. PATENT DOCUMENTS

4,440,372  4/1984  Wisniewski .............................. 248/406
4,966,045  10/1990  Harney ................................ 74/424.8 A
5,311,788  5/1994  Kasuga ....................................... 74/459
5,467,957  11/1995  Gauger ................................... 74/89.15
5,505,104  4/1996  Takei ..................................... 74/89.15

Primary Examiner—Charles A. Marmor
Assistant Examiner—David Fenstermacher
Attorney, Agent, or Firm—Fildes & Outland, P.C.

[57] ABSTRACT

A drive for adjusting parts of seating and reclining furniture, preferably for adjustable chairs, consisting of a basic housing for accepting a mechanism for driving a spindle fixed in position in the basic housing in a rotating manner, and a motor flanged to the side of the basic housing and connected to the mechanism, an accepting device for connection to a holding device and an adjuster for adjusting the movable part of the seating or reclining furniture being provided on the basic housing. In order to create a compact drive for parts of seating and reclining furniture, preferably for adjustable chairs, in which the length of the housing is independent of the stroke length of the drive to be realized, the spindle (6) is surrounded by a two-part guide section (8, 9) connected to the basic housing (1), a slit (10) being kept free between the two parts of the guide section (8, 9) through which a nut (16), guided by the spindle (6) in a movable and non-twisting manner within the guide sections (8, 9), is connected with the adjuster. In this context, the adjuster can be designed as a slider (18) surrounding the outside of the guide sections (8, 9) in a form-fitting manner.

29 Claims, 9 Drawing Sheets

DRIVE FOR ADJUSTING PARTS OF SEATING AND RECLINING FURNITURE

The invention relates to a drive for adjusting parts of seating and reclining furniture, preferably for adjustable chairs, consisting of a basic housing for accepting a mechanism for driving a spindle fixed in position in the basic housing in a rotating manner and surrounded by a guide section connected to the basic housing, and a motor flanged to the side of the basic housing and connected to the mechanism, an accepting device for connection to an adjuster for adjusting the movable part of the seating or reclining furniture being provided on the basic housing and in which the spindle drives a nut which moves in the longitudinal direction in a non-twisting manner within the guide section, the nut being connected to the adjuster.

A drive of this kind is known from DE-GM 89 03 603, for example, in which a mechanism, consisting of a gearwheel connected to a spindle and a worm engaging the gearwheel, is arranged inside a housing. The worm is driven by an electric motor fastened to the side of the housing. A nut, on which a lifting tube capable of movement in the lifting tube accepting device is fastened, is guided in a non-twisting manner on the spindle within a lifting tube accepting device projecting from the housing. The lifting tube can be easily adjusted if this drive is fixed in pivoting fashion via an accepting device located on the housing and the lifting tube is coupled with an adjuster for slatted bases.

This kind of drive, also referred to as an individual drive, has the particular disadvantage that its total length is determined by the necessary minimum length for guiding the lifting tube in the lifting tube accepting device plus the lifting path of the lifting tube. This minimum length is necessary in order to reliably prevent the lifting tube from buckling over long travel paths. This means that it is necessary to simultaneously lengthen the lifting tube accepting device in the event of increasing the stroke length of the lifting tube. This makes it necessary to manufacture housings with different lengths of lifting tube accepting device within certain limits, rendering the manufacture of the drives considerably more expensive.

Furthermore, this kind of drive cannot be used unobtrusively in constricted spaces, as is the case with adjustable seating and reclining furniture.

Moreover, an adjuster is known from DE 37 34 922 A1 which is designed to be adjustable in the longitudinal direction on a special section tube by means of a nut/spindle mechanism. The nut part located within the special section tube is designed in one piece, including a sliding shell which partially surrounds the special section tube and strips guided in grooves in the special section tube. A web which reaches through a groove in the special section tube and connects these parts is provided between the nut and the sliding shell to this end. As the sliding shell only partially surrounds the special section tube, an additional sliding support is provided, the sliding shell and sliding support being screwed together.

The host of individual parts means that assembly involves a considerable effort, simultaneously resulting in increased costs.

The task of the invention is thus to create a compact drive for parts of seating and reclining furniture, preferably for adjustable chairs, in which the length of the housing is independent of the stroke length of the drive to be realised, and which is inexpensive to manufacture and easy to assemble.

In a drive of the kind mentioned at the start, this task is solved in that the adjuster is designed as a slider surrounding the outside of the guide sections in a form-fitting manner, the guide section being designed in two parts and a slit being kept free between the two parts of the guide section, and in that the slider is connected to the nut by means of longitudinal fins which reach through the slit.

This solution creates a particularly compact drive of simple design for adjustable chairs, its total length being determined by the desired stroke length of the adjuster plus the length of the basic housing, and the length of the basic housing being independent of the stroke length of the adjuster. Furthermore, the total length of the drive remains constant over all freely selectable adjusting paths within the specified limits. This has the particular advantage that no additional space has to be kept free in the vicinity of the drive. The nut is assembled with the slider by simply sliding it onto the guide section while simultaneously rotating the spindle.

One particular advantage of the invention is that the slider can be connected to the nut in one piece. This can be done by manufacturing an injection-moulded part with the nut integrally moulded on the inside, for example. This injection-moulded part can easily be manufactured as an individual slider or in any length with subsequent division into individual sliders. Plastic or aluminium can be used as the material for this purpose.

A further development of the invention is characterised in that the guide sections display a shell-shaped, fret-like cross-section and are positively connected to the basic housing.

This can be preferably achieved by providing the inside of the basic housing with accepting fins which reach laterally into recesses in the guide sections.

In order to transmit greater forces in the axial direction and to prevent the possibility of the guide sections being pulled out of the basic housing, these are fixed in the basic housing in the axial direction.

This can be easily realised in that each guide section is provided with a milled recess on its outer side, into which a fixing screw screwed into the side of the basic housing or a fin connected to the basic housing reaches.

The free ends of the guide sections are sealed with an end cap which connects them, this end cap being positively connected to the guide sections. This avoids otherwise necessary spacers in connection with screwed connections.

As lateral wobble can occur, particularly with relatively long spindles, an additional bush for guiding the spindle is integrally moulded on the inside of the end cap.

Furthermore, the end cap should be fixed on the guide sections in the axial direction, which can be achieved by the end cap being connected to at least one of the guide sections by means of a screwed connection. This can prevent unintentional loosening of the end cap. At the same time, this creates the possibility of the end cap being provided with an accepting device for connection to a holding device.

The accepting devices on the basic housing and/or the end cap can be designed as fork heads or as fastening sections provided with a cross-hole.

In order to avoid the possibility of the spindle being crushed within the basic housing under higher loads and of the gearwheel thus becoming disengaged, a bush surrounding the spindle is provided in the basic housing and positively connected to the guide sections.

In one version, the bush can also consist of bearing shells which follow on from the guide section and are inserted or moulded into the basic housing.

In an advanced development of the invention, a fork coupled with the operating device of the adjustable chair is hinged on the slider.

The hinge points of the fork can be displaced forwards or backwards relative to the basic housing by means of plates on which the fork is hinged and which are laterally fastened to the slider.

In order to avoid the penetration of dust, it is advantageous if the slit between the guide sections is covered by bellows surrounding the latter. These bellows also reduce the risk of injury emanating from the otherwise freely accessible slit.

In an advanced development of the invention, the drive is connected to a peripheral mains isolation device which completely isolates the drive from the mains when not in use.

In order to prevent the guide sections being loaded in a transverse direction, it is expedient to stationarily hinge the accepting device located on the basic housing or that located on the end cap on a holding arm in pivoting fashion. When the slider is operated, the fork can thus be pivoted over the entire lifting path, with only axial forces acting on the guide sections as the free end of the drive can freely pivot upwards or downwards.

In one version, the accepting devices on the basic housing and the end cap are both stationarily fastened to one holding arm each, the fork being coupled with the slider as a hinged fork via an additional lever arm. This also effectively prevents the occurrence of lateral forces.

In order to facilitate assembly of the drive in the latter case, it is advantageous if one of the accepting devices is designed as an open, snap-in fork head.

Furthermore, the guide sections should be made of metal, preferably aluminium, in order to achieve the greatest possible load-bearing capacity and longest possible service life of the drive.

The invention also offers the possibility of manufacturing the guide sections out of endless material cut to length or of pre-fabricated sections of longer length, this permitting particularly low-cost manufacture of the drive. Extrusion processes are especially suitable for manufacturing the guide sections.

In a further configuration of the invention, one of the guide sections is provided with a channel running parallel to the spindle to accept limit switches operated by the nut, so that the drive motor is deactivated upon reaching the respective stroke limit position and electrical and/or thermal overloading of the motor is thus avoided.

The invention is described in more detail below on the basis of a practical example. The associated drawings show the following.

Figure 1:
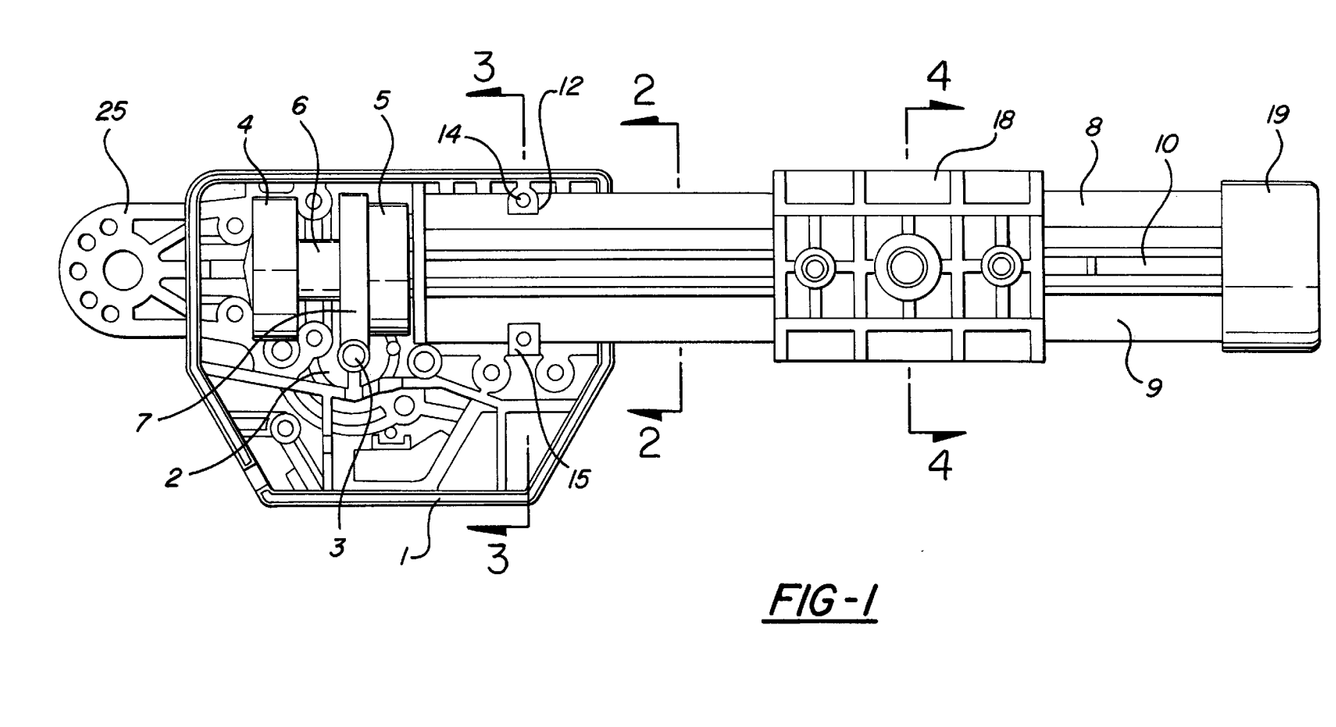
FIG. 1 A view of a drive according to the invention for parts of seating and reclining furniture, with the basic housing open, FIG. 2 A sectional representation of the drive along line A—A in FIG. 1, 5 or 6, FIG. 3 A sectional representation of the drive along line B—B in FIG. 1, 5 or 6, FIG. 4 A sectional representation of the drive along line C—C in FIG. 1, 5 or 6, FIG. 5 A sectional representation of the drive as per FIG. 1 with a simple end cap, FIG. 6 A sectional representation of the drive as per FIG. 1 with an end cap with an integrally moulded bush, FIG. 7 A side view of the drive with a basic housing fixed in position on one side and a fork coupled to the slider, FIG. 8 The front view of the drive as per FIG. 7 with a sectional representation along line D—D in FIG. 7, FIG. 9 A side view of the drive with basic housing fixed in position on one side and a fork coupled to the slider via an additional plate, FIG. 10 The front view of the drive as per FIG. 9 with a sectional representation along line E—E in FIG. 9, FIG. 11 A drive hinged to the end cap in a fixed position on one side with a fork hinged on the slider, FIG. 12 A drive, fixed in position on both sides, in which a hinged fork is hinged on the slider via an additional lever arm, FIG. 13 The drive as per FIG. 12, in which one of the accepting devices is replaced by an open, snap-in fork head designed according to FIG. 13a, and FIG. 13a The enlarged representation of a snap-in fork head.

According to FIG. 1, the drive according to the invention for adjusting parts of seating and reclining furniture consists of a basic housing 1, to the side of which a motor 2 with a worm 3, which protrudes into basic housing 1, is flanged. Basic housing 1 consists of two halves of mirror-inverted design, of which only one is illustrated in FIG. 1. Furthermore, two rolling bearings 4 and 5, recessed in bearing shells some distance apart, are located in basic housing 1 for mounting a rotating spindle 6, on which a gearwheel 7 is fastened between rolling bearings 4 and 5. This gearwheel 7 engages with worm 3 driven by motor 2, so that rotating worm 3 causes spindle 6 to rotate.

Furthermore, two guide sections 8 and 9, surrounding spindle 6 some distance apart, are recessed in basic housing 1 in such a way that a slit 10 is kept free on both sides between guide sections 8 and 9.

Figure 2:
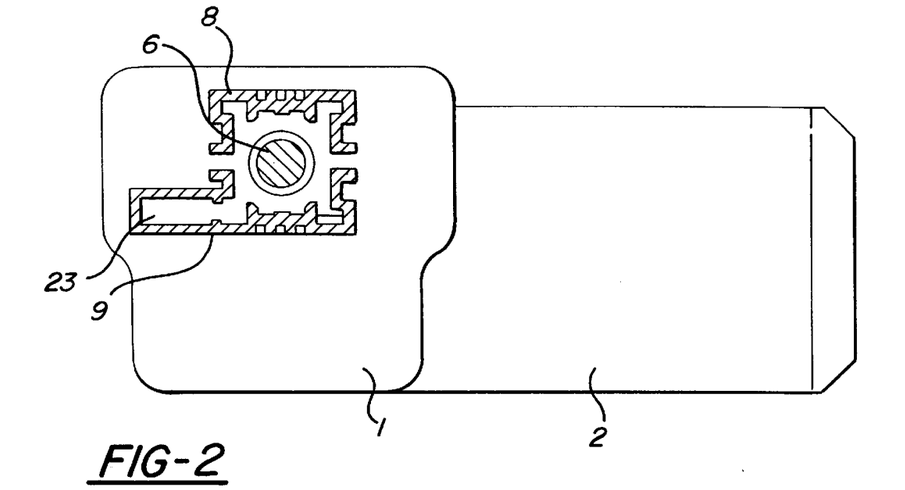
Figure 4:
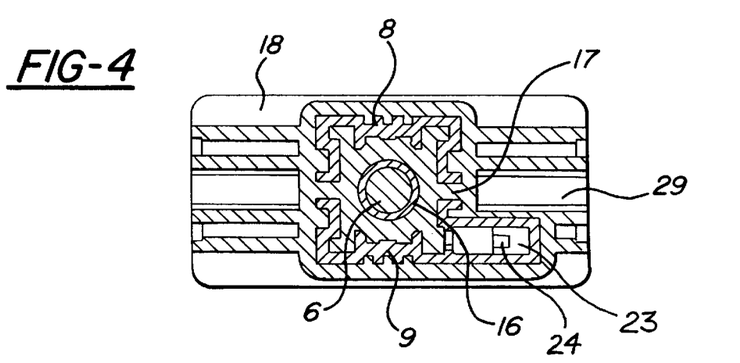

As FIGS. 2 and 4 show, the inside and outside of guide sections 8 and 9 each have a fret-like cross-section or at least a multi-profiled cross-section. These guide sections 8 and 9 are preferably made of aluminium and can be very easily and cheaply manufactured in any length by means of extrusion. They can then be adapted to the respectively desired stroke length shortly before assembling the drive.

Figure 3:
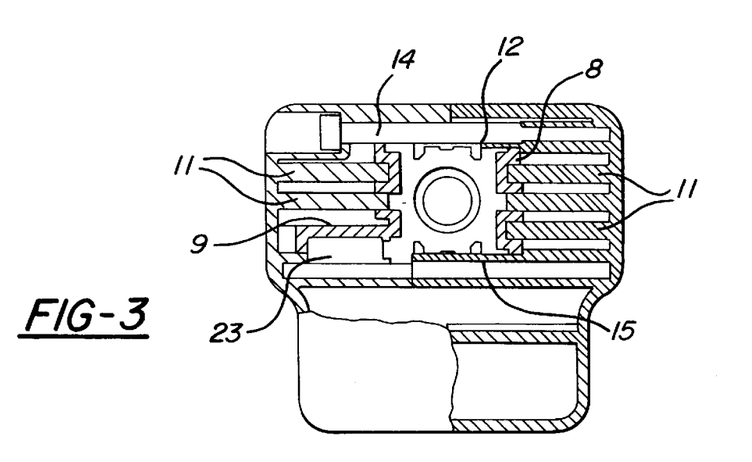

The special profiling of guide sections 8 and 9 creates the possibility of positively fastening them in a non-twisting manner in basic housing 1 by means of integrally moulded accepting fins 11 extending laterally towards guide sections 8 and 9 within basic housing 1, these fins engaging in corresponding recesses on the outside of guide sections 8 and 9 (FIG. 3). Accepting fins 11 provide a particularly firm connection of guide sections 8 and 9 to basic housing 1.

In order to additionally fix guide sections 8 and 9 in the axial direction in the basic housing, they are each additionally provided with a milled recess 12 and 13 running transversely on their outside (FIG. 1). A fixing screw 14 is screwed into milled recess 12 for this purpose, the screw simultaneously serving to connect the two halves of basic housing 1. The second milled recess 13 accepts a fin 15 which projects from basic housing 1 in the direction of milled recess 13. In this manner, guide section 8 is fixed in basic housing 1 by fixing screw 14 and guide section 9 by fin 15.

Arranged between guide sections 8 and 9 on spindle 6, which has a screw thread, is a nut 16 whose external profile corresponds to the internal profile of guide sections 8 and 9. Nut 16 can thus be moved backwards and forwards by spindle 6 without twisting (FIG. 4).

As FIG. 3 further shows, nut 16 is connected to a slider 18 in one piece by fins 17, which extend through slits 10 on both sides of nut 16, the internal contour of slider 18 corresponding to the external contour of guide sections 8 and 9. Considerable mechanical stability of the overall drive in every stroke position of slider 18 is achieved by the one-piece connection of nut 16 to slider 18 and by the fact that nut 16 supports guide sections 8 and 9 internally and slider 18 surrounds guide sections 8 and 9 with the same shape.

Naturally, it is also possible to manufacture nut 16 and slider 18 individually and connect them during assembly by a screwed connection reaching through slit 10. However, the forces which can be transmitted are markedly lower in this case.

The one-piece nut/slide combination 16/18 or the individual parts can be manufactured by injection moulding or extrusion, plastic or aluminium coming into question as materials.

The free ends of guide sections 8 and 9 are also positively sealed and connected by an end cap 19, preferably made of plastic.

Figure 5:
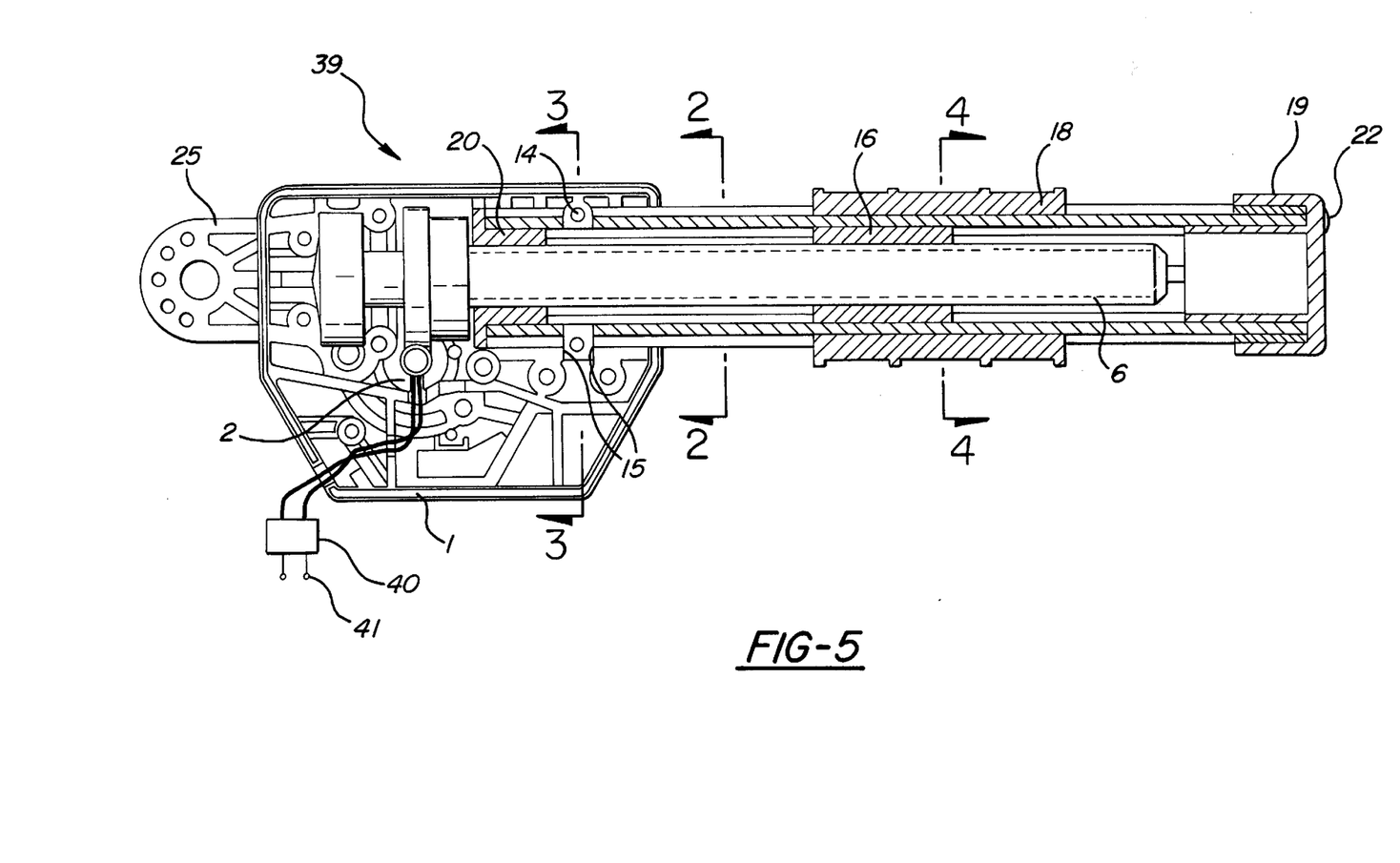

In order to prevent spindle 6 being crushed within basic housing 1 if higher forces occur, a bush 20 is positively recessed in guide sections 8 and 9 within basic housing 1 (FIG. 5). It is, of course, also possible to recess or mould individual bearing shells into basic housing 1, following on from guide sections 8 and 9.

Figure 6:
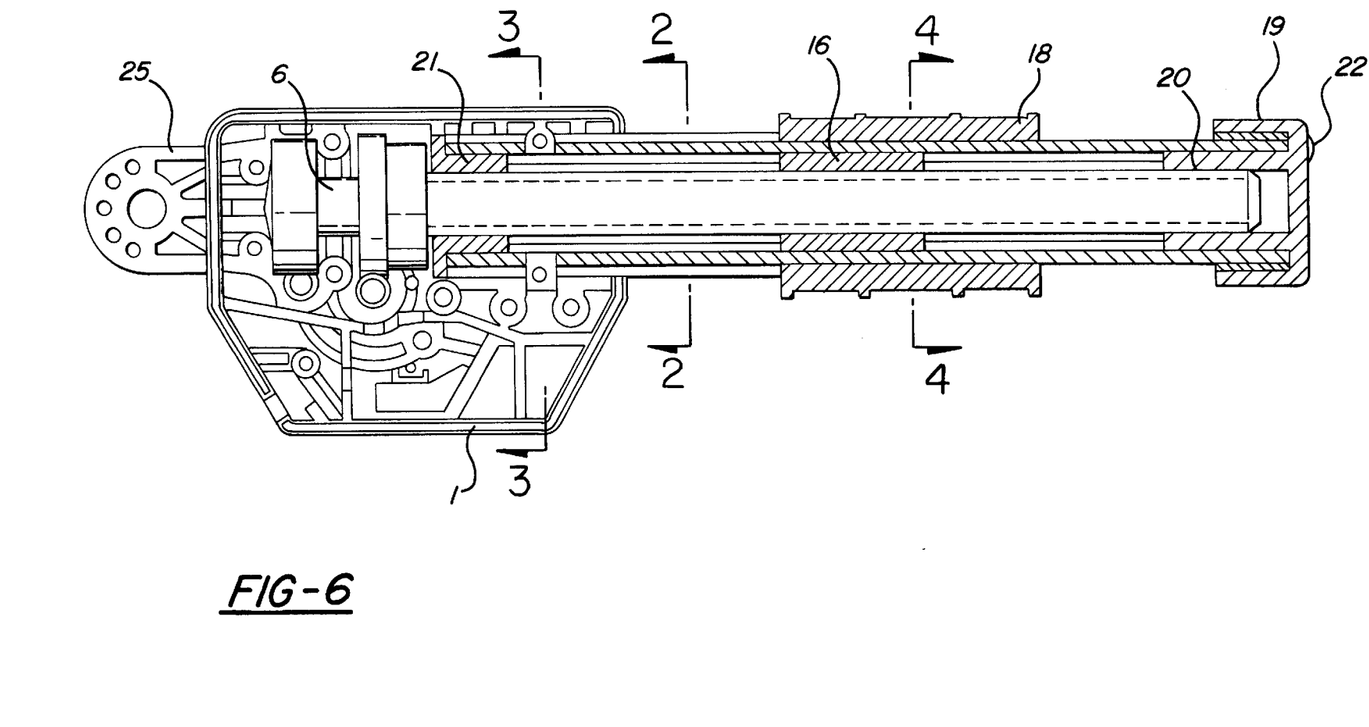

As FIG. 6 shows, end cap 19 can also be provided with an integrally moulded bush 21, in which the free end of spindle 6 is guided. This prevents the wobble otherwise possible with relatively long spindles 6.

End cap 19 can be fastened to guide sections 8 and 9 in the axial direction by means of either a positive snap-in connection or a screwed connection 22, or in the transverse direction in a manner similar to the axial fixing of guide sections 8 and 9 in basic housing 1.

Nut 16 and the corresponding slider 18 can be assembled by simply positioning it on guide sections 8 and 9 while simultaneously rotating spindle 6 and then attaching end cap 19.

Furthermore, lower guide section 9 is provided with a longitudinal channel 23 for accepting limit switches 24 (FIGS. 2, 3 and 4).

In order to avoid the penetration of dust, it is advantageous if slit 10 between guide sections 8 and 9 is covered by bellows surrounding the latter, leaving only slider 18 free. These bellows completely eliminate the risk of injury otherwise emanating from the freely accessible slit 10.

Furthermore, the drive can be provided with a peripheral mains isolation device 40 which completely isolates the drive from the mains 41 when not in use.

Figure 7:
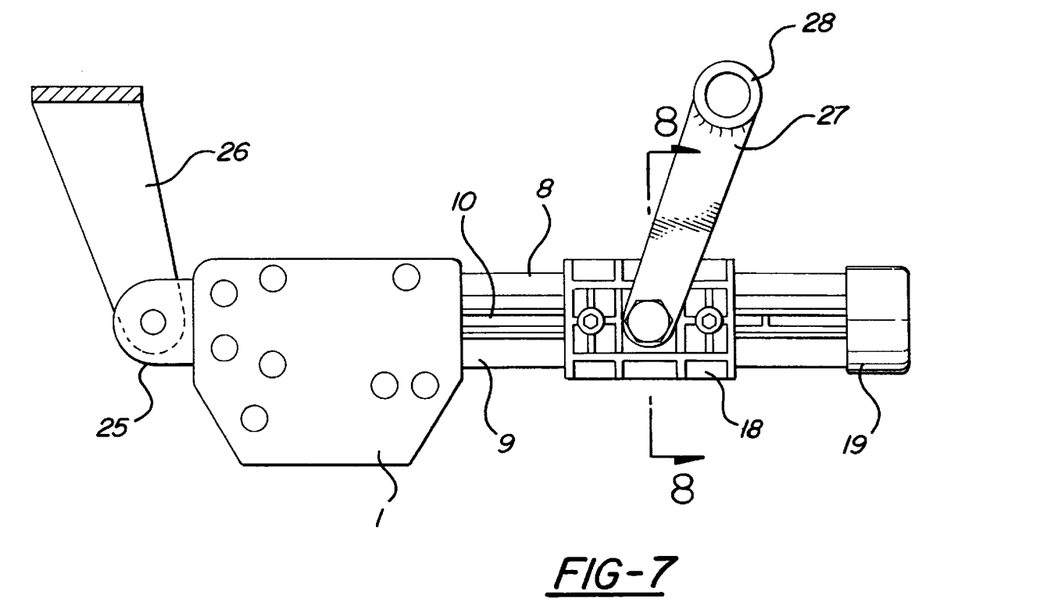
Figure 8:
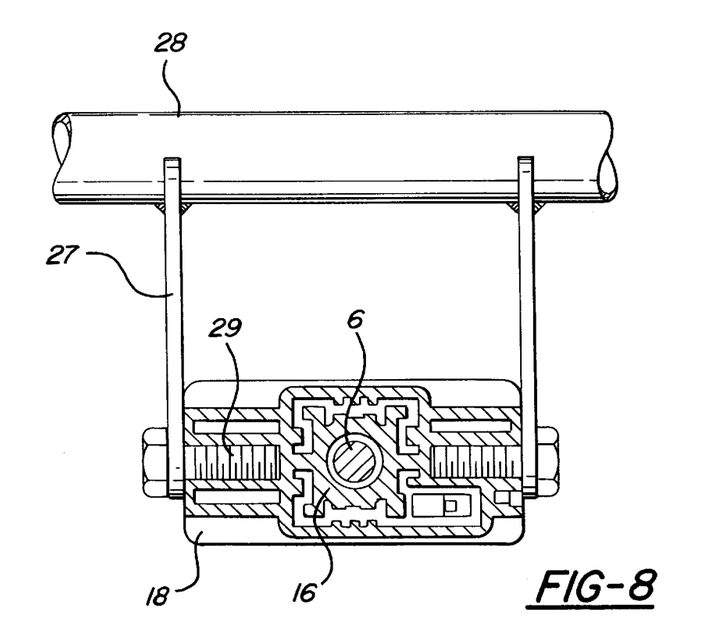

FIGS. 7 and 8 show an installation version of the drive in which basic housing 1 is stationarily hinged in pivoting fashion to a holding arm 26 by means of an accepting device 25, in the form of a fork head for example. A fork 27 is fastened in pivoting fashion to slider 18, the fork in turn being connected to an operating device (not illustrated) for adjustable parts of seating and reclining furniture via a shaft 28. Fork 27 can be fastened to slider 18 by a fastening device 29—via screws laterally screwed into slider 18, for example. It is likewise possible to recess lateral bushes or axles in slider 18, to which fork 27 can be positively connected.

This installation version of the drive ensures that only axial forces act on basic housing 1 and guide sections 8 and 9, as the free end of the drive can pivot freely.

Figure 9:
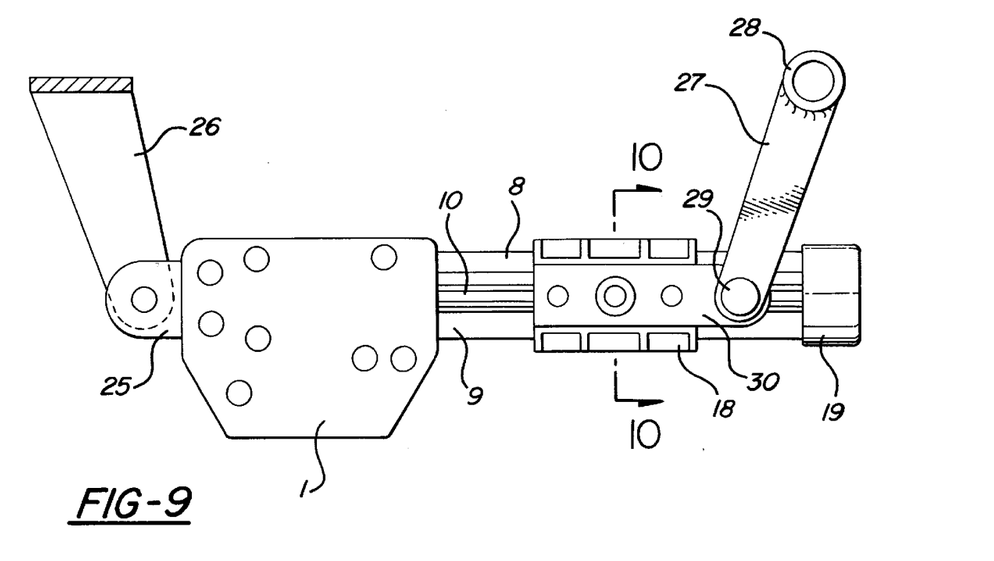
Figure 10:
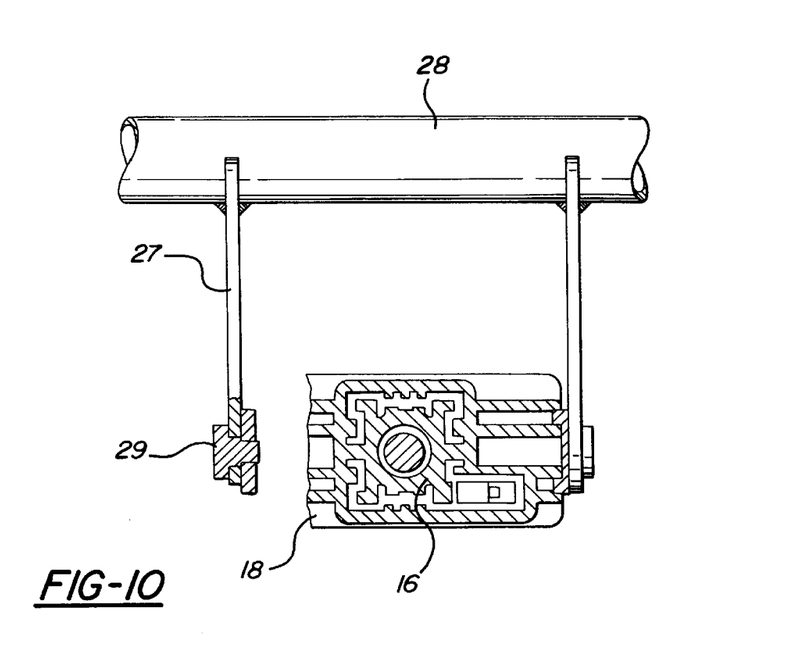

A further version is shown in FIGS. 9 and 10. Here, fork 27 is not hinged to slider 18 directly, but via a plate 30 screwed or welded to the slider. This creates the possibility of shifting the hinge point on the slider backwards towards basic housing 1 or forwards.

Figure 11:
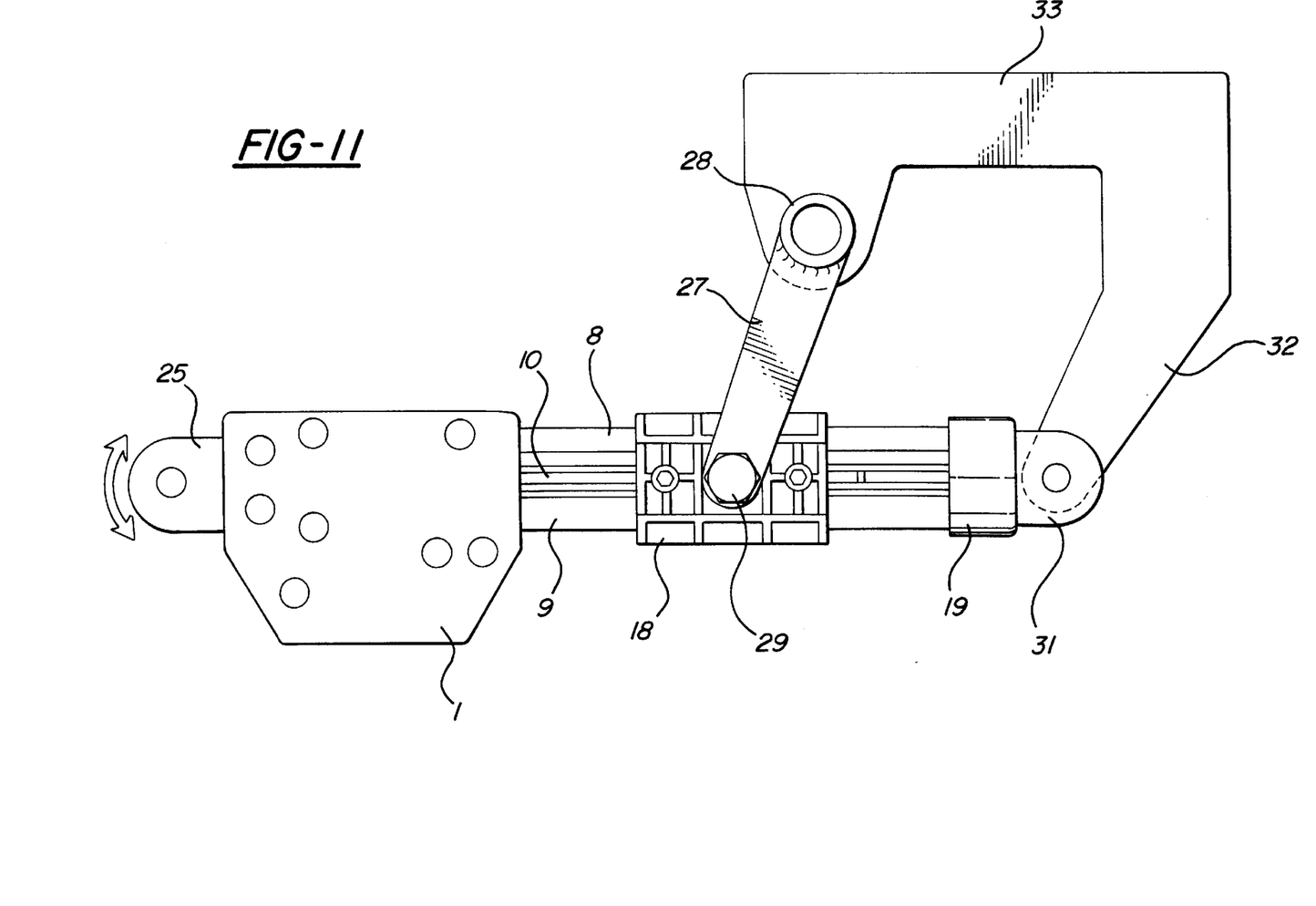

FIG. 11 shows an installation version of the drive in which it is stationarily hinged to a holding arm 32 in rotating fashion via an accepting device 31 on end cap 19. Fork 27, hinged on slider 18, is again connected to the operating device of a slatted base in the manner shown in FIGS. 9 and 10, an additional auxiliary frame 33 being provided to accept holding arm 32 and shaft 28 in this case.

Figure 12:
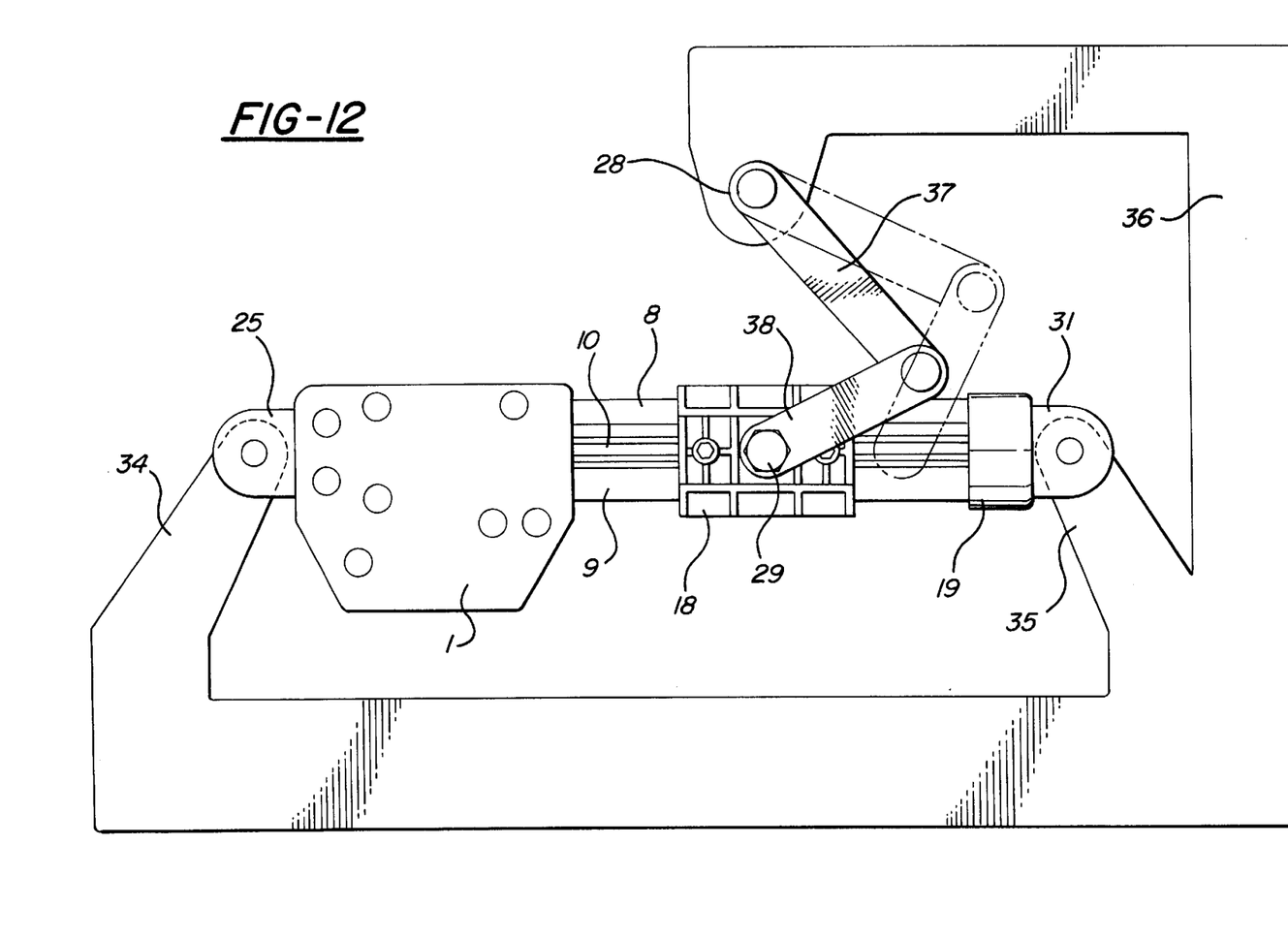
Figures 13, 13A:
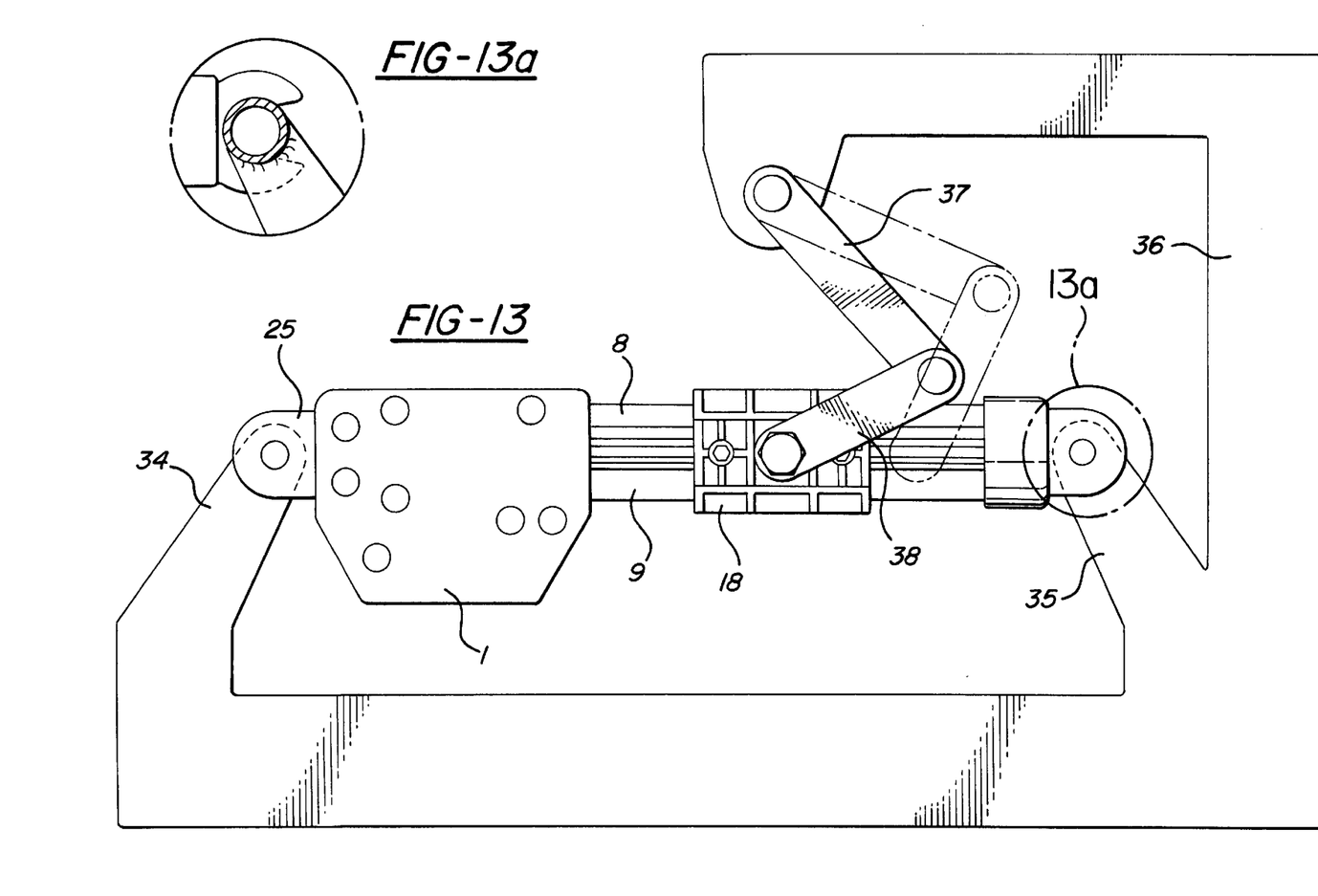

FIGS. 12 and 13 show a special installation version. In this case, the drive is fastened in holding arms 34 and 35 in a stationary manner on both sides, the arms projecting from an auxiliary frame 36. Slider 18 is connected to the operating device of a slatted base via a hinged fork 37 with an additionally hinged lever arm 38.

This installation version likewise ensures that only axial forces act on guide sections 8 and 9.

In order to facilitate assembly of the drive in this case, it is advantageous if one of accepting devices 25 and 31 is designed as an open, snap-in fork head pursuant to FIG. 13a.

I claim:

1. Drive for adjusting parts of seating and reclining furniture, including a basic housing for accepting a mechanism for driving a spindle fixed in position in the basic housing in a rotating manner and surrounded by a guide section connected to the basic housing and a motor flanged to the side of the basic housing, and connected to the mechanism, an accepting device for connection to an adjuster for adjusting the movable part of the seating or reclining furniture being provided on the housing and in which the spindle drives a nut and said nut moves longitudinally in a non-twisting manner within the guide section, the nut being connected to the adjuster, characterized in that the guide section has two parts and a slit between the two parts of the guide section, and that a slider is designated as the adjuster which is connected to the nut by means of longitudinally extending fins which reach through the slit.

2. Drive as per claim 1, characterized in that the slider surrounds the outside of the guide sections in a form-fitting manner.

3. Drive as per claim 2, characterized in that the guide sections have a fret shaped cross-section and are positively connected to the basic housing.

4. Drive as per claim 3, characterized in that the inside of the basic housing is provided with accepting fins which laterally reach into recesses in the guide sections.

5. Drive as per claim 1, characterized in that the slider is connected to the nut.

6. Driver as per claim 1, characterized in that the guide sections are fixed on the axis of the basic housing.

7. Drive as per claim 6, characterized in that the outside of each guide section is provided with a milled recess, and a fixing screw is screwed into one of the milled recesses to secure one of the guide sections to the basic housing and a fin extending from the basic housing protrudes into the other milled recess to secure the other guide section to the basic housing.

8. Drive as per claim 1, characterized in that free ends of the guide sections are sealed with an end cap which connects the free ends.

9. Drive as per claim 8, characterized in that the end cap is positively connected to the guide sections.

10. Drive as per claim 9, characterized in that a bush for guiding the spindle is molded on the inside of the end cap.

11. Drive as per claim 10, characterized in that the end cap is fixed on the guide sections on the axis of the basic housing.

12. Drive as per claim 11, characterized in that end cap is connected to at least one of the guide sections by means of a screwed connection.

13. Drive as per claim 12, characterized in that the end cap is provided with an accepting device for connection to a holding device.

14. Drive as per claim 13, characterized in that the accepting devices on one of the basic housing and the end cap are designed as fork heads.

15. Drive as per claim 14, characterized in that the accepting devices on one of the basic housing and the end cap are designed as fastening sections provided with a cross-hole.

16. Drive as per claim 15, characterized in that the bush consists of bearing shells which extend from the guide section and are inserted or molded into the basic housing.

17. Drive as per claim 1, characterized in that a bush surrounding the spindle is provided within the basic housing, the bush being positively connected to the guide sections.

18. Drive as per claim 1, characterized in that a fork coupled with the operating device is hinged on the slider.

19. Drive as per claim 18, characterized in that the fork is connected to the slider via plates fastened to the side of the slider.

20. Drive as per claim 1, characterized in that the slit between the guide sections is covered by bellows surrounding the guide sections.

21. Drive as per claim 1, characterized in that the drive is connected to a peripheral mains isolation device which isolates the drive from the mains when not in use.

22. Drive as per claim 1, characterized in that the accepting device on the basic housing is hinged to a holding arm in pivoting fashion.

23. Drive as per claim 1, characterized in that the accepting device on the end cap is hinged to a holding arm in pivoting fashion.

24. Drive as per claim 1, characterized in that the accepting devices on the basic housing and an end cap are each fixed in position on one holding arm and that a fork is coupled with the slider as a hinged fork via an additional lever arm.

25. Drive as per claim 24, characterized in that one of the accepting devices is designed as an open, snap-in fork head.

26. Drive as per claim 1, characterized in that the guide sections are made of metal.

27. Drive as per claim 26, characterized in that the guide sections are made of aluminum.

28. Drive as per claim 1, characterized in that the guide sections are made of extruded material cut to length.

29. Drive as per claim 1, characterized in that one of the guide sections is provided with a channel running parallel to the spindle to accept limit switches operated by the nut.

* * * * *